United States Patent
Giebel et al.

(10) Patent No.: US 9,892,299 B1
(45) Date of Patent: Feb. 13, 2018

(54) MODULE AND SYSTEM FOR, AND METHOD OF, ELECTRO-OPTICALLY READING A TARGET WITH REDUCED SPECULAR REFLECTION

(71) Applicant: SYMBOL TECHNOLOGIES, LLC, Lincolnshire, IL (US)

(72) Inventors: James R. Giebel, Centerport, NY (US); Edward Barkan, Miller Place, NY (US); Christopher W. Brock, Manorville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/373,990

(22) Filed: Dec. 9, 2016

(51) Int. Cl.
  *G06K 7/10* (2006.01)
  *G06K 19/06* (2006.01)
  *G06K 7/14* (2006.01)

(52) U.S. Cl.
  CPC ...... *G06K 7/10742* (2013.01); *G06K 7/10811* (2013.01); *G06K 7/10831* (2013.01); *G06K 7/1413* (2013.01); *G06K 19/06028* (2013.01)

(58) Field of Classification Search
  CPC ........... G06K 7/10722; G06K 7/10732; G06K 7/10752; G06K 7/10792; G06K 7/10851; G06K 7/146; G06K 7/1465
  USPC .............................................. 235/454, 462.42
  See application file for complete search history.

(56) References Cited

U.S. PATENT DOCUMENTS

| | | | | |
|---|---|---|---|---|
| 8,011,584 B2 * | 9/2011 | Powell | | G06K 7/146 |
| | | | | 235/455 |
| 8,523,074 B2 * | 9/2013 | Marcus | | G06K 7/10732 |
| | | | | 235/454 |
| 8,978,984 B2 * | 3/2015 | Hennick | | G06K 7/10732 |
| | | | | 235/462.41 |
| 9,367,726 B1 * | 6/2016 | Ashby | | G06K 7/1465 |
| 2015/0053767 A1 * | 2/2015 | Sackett | | G06K 7/1465 |
| | | | | 235/462.06 |
| 2016/0350566 A1 * | 12/2016 | Ye | | G06K 7/10752 |

* cited by examiner

Primary Examiner — Seung Lee
(74) Attorney, Agent, or Firm — Yuri Astvatsaturov (57) ABSTRACT

One light source is energized and another light source is simultaneously deenergized during one frame of an imager that captures return light from an illuminated target as a first image portion having a first target portion. The other light source is energized and the one light source is simultaneously deenergized during another frame to capture the return light from the illuminated target as a second image portion having a second target portion. Either the target portions are combined to form the target to be read, or the image portions are combined to form a composite image from which the target is read.

19 Claims, 7 Drawing Sheets

FRAME 1

| REGION 1 LED1 ON | REGION 2 LED2 ON |
|---|---|
| REGION 3 LED2 ON | REGION 4 LED1 ON |

FRAME 2

| REGION 1 LED2 ON | REGION 2 LED1 ON |
|---|---|
| REGION 3 LED1 ON | REGION 4 LED2 ON |

FIG. 6

FRAME 1

| SLIT FRAME 1 LED1 ON |
|---|
| SLIT FRAME 2 LED2 ON |
| SLIT FRAME 3 LED1 ON |

FRAME 2

| SLIT FRAME 1 LED2 ON |
|---|
| SLIT FRAME 2 LED1 ON |
| SLIT FRAME 3 LED2 ON |

FIG. 7

FRAME 1

| SLIT FRAME 1 LED1 ON |
|---|
| SLIT FRAME 2 LED2 ON |

FRAME 2

| SLIT FRAME 1 LED2 ON |
|---|
| SLIT FRAME 2 LED1 ON |

MODULE AND SYSTEM FOR, AND METHOD OF, ELECTRO-OPTICALLY READING A TARGET WITH REDUCED SPECULAR REFLECTION

BACKGROUND OF THE INVENTION

The present disclosure relates generally to an imaging module and a system for, and a method of, electro-optically reading a target by image capture, and more particularly, to illuminating the target to be read by alternately energizing and deenergizing light sources in a timed manner that mitigates specular reflection from interfering with the reading and at a blink rate that minimizes unpleasant blinking light patterns from visually annoying operators and people in proximity with the module/system.

Solid-state imaging systems or imaging readers have been used, in both handheld and/or hands-free modes of operation, to electro-optically read targets, such as one- and two-dimensional bar code symbol targets, and/or non-symbol targets, by image capture. A handheld imaging reader includes a housing having a light-transmissive window and a handle held by an operator. An imaging module, also known as a scan engine, is supported by the housing and aimed by the operator at a target during reading. The imaging module includes a solid-state imager or imaging sensor with an array of photocells or light sensors, which correspond to image elements or pixels in an imaging field of view of the imager, and an imaging lens assembly for capturing return light scattered and/or reflected from the target through the window, and for projecting the return light onto the array to initiate capture of an image of the target. Such an imager may include a one- or two-dimensional charge coupled device (CCD) or a complementary metal oxide semiconductor (CMOS) device, with global or rolling exposure shutters, and associated circuits for producing and processing electronic signals corresponding to a one- or two-dimensional array of pixel data over the imaging field of view. A typical imager may operate at a frame rate of about 30-60 frames per second (or Hz) to acquire an entire target image. Each frame is a unique, consecutive image acquired by the imager.

In order to increase the amount of the return light captured by the array, especially in dimly lit environments and/or at far range reading, the imaging module generally also includes an illuminating light assembly for illuminating the target with illumination light for reflection and scattering therefrom. The illumination light is typically emitted from illumination light sources, e.g., light emitting diodes (LEDs), and illumination lenses may be used to modify the illumination light over an illumination field. Although generally satisfactory for its intended purposes, the use of the LEDs has sometimes proven to be disadvantageous, because a portion of the emitted illumination light incident on the target is reflected therefrom back into the imaging field of view of the image sensor. The reflected portion of the illumination light may sometimes create undesirable bright or "hot" spots in the imaging field of view, and these hot spots, also known as glare, constitute specular light, which can overload, saturate, obscure, interfere, and sometimes even "blind" the image sensor, especially on an initial reading attempt, thereby degrading reading performance. The effects of specular light may be worsened when the target is printed on a label having a glossy surface, or when the target itself has a highly reflective, outer surface, because such glossy, reflective surfaces promote mirror-like, specular reflections.

To mitigate such specular reflections, it is known to energize only a first LED throughout a first frame of the imager to capture a first image of the target, and to subsequently energize only a second LED throughout a second frame of the imager to capture a second image of the target. A main controller can then combine or stitch an area of the first image that is substantially free of specular reflection with an area of the second image that is also substantially free of specular reflection to form a composite image, and then process the composite image to read the target without interference from specular reflections.

Although generally satisfactory for its intended purposes, this approach cuts the effective frame rate in half since it takes two frames to produce the composite image. A slow frame rate is not desirable, especially in those applications where aggressive, fast reading performance is needed. In addition, each LED is energized, pulsed, or blinked, once every two frames. Put another way, each LED has a blink rate that is half of the frame rate. If the imager operates at a frame rate of about 30-60 Hz, then the blink rate is 15-30 Hz. Bright illumination pulses emitted by the LEDs shining out of the window, especially at pulse rates below 50-60 Hz, can be annoying or uncomfortable to the operator, or to a consumer or others standing nearby the reader.

Accordingly, there is a need to increase the blink rate to a comfortable level while mitigating specular reflections from interfering with the reading of the target.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module for reading a target, e.g., a bar code symbol, to be electro-optically read by image capture. The symbol has elements, e.g., bars and spaces, of different light reflectivity and spaced apart to define a machine-readable code that is indicative of an object that is attached to, or associated with, the symbol. The module includes a plurality of illumination light sources, an imaging sensor for capturing return light from the target over successive frames, and a main controller operatively connected to the light sources and the imaging sensor. The main controller energizes at least one of the light sources and simultaneously deenergizes at least another of the light sources during at least one of the frames to capture the return light from the illuminated target as at least a first image portion having a first target portion, and also energizes the at least other light source and simultaneously deenergizes the at least one light source during at least another of the frames to capture the return light from the illuminated target as at least a second image portion having a second target portion. The main controller processes the first and second image portions together by combining the first and second image portions to form a composite image, and then processes the composite image to enable the target to be read. Alternately, the main controller processes the first and second target portions by combining the first and second target portions together to form the target. In the case where the target is a symbol, each target portion includes a data pattern, e.g., at least part of the elements of the symbol, in which case, the main controller stitches the elements of the symbol together to form the symbol to be read.

The imaging sensor is a solid-state device having an array of photosensors arranged along mutually orthogonal rows and columns. In one embodiment, the imaging sensor has a global shutter for simultaneously exposing all the rows and columns of photosensors of the array, and only some of the rows and columns, e.g., the odd-numbered rows and odd-numbered columns, are read out during the at least one frame, and only others of the rows and columns, e.g., the even-numbered rows and even-numbered columns, are read out during the at least other frame.

In other embodiments, the main controller subdivides each frame into a plurality of subframes; energizes and deenergizes the at least one light source, and simultaneously deenergizes and energizes the at least other light source, during the subframes of the at least one frame to capture the return light from the illuminated target as a plurality of the first image portions having a plurality of the first target portions; and energizes and deenergizes the at least other light source, and simultaneously deenergizes and energizes the at least one light source, during the subframes of the at least other frame to capture the return light from the illuminated target as a plurality of the second image portions having a plurality of the second target portions. If the imaging sensor has a rolling shutter for sequentially exposing the rows and columns of photosensors of the array, then each subframe includes a minor fraction of a total number of the rows and columns, thereby defining a sub-array or region having an aspect ratio. If the imaging sensor has a global shutter, then a slit readout sequentially reads out a minor fraction of a total number of the rows and columns during each subframe, thereby defining a sub-array or region having an aspect ratio. In both cases, the subframes need not be of equal size or of equal time duration, and each sub-array or region may have any desired aspect ratio. The rows and/or columns in each sub-array or region need not be consecutive; for example, one sub-array or region may comprise some or all of the even rows and/or columns, and another sub-array or region may comprise some or all of the odd rows and/or columns.

Advantageously, the imaging sensor is operative for capturing return light from the target over successive frames at a frame rate, and the main controller energizes and deenergizes, i.e., pulses, each light source at a pulse or blink rate that is at least equal to, and preferably exceeds, the frame rate. For example, if each frame is subdivided into three equal time intervals, then the blink rate is 1.5 times the frame rate. As another example, if each frame is subdivided into five equal time intervals, then the blink rate is 2.5 times the frame rate. This rapid blink rate reduces the known slow blink rate, e.g., below 40 Hz, that is often annoying or uncomfortable to an operator, or to a consumer or others standing nearby the module. Specular reflection effects are thus mitigated by pulsing the different light sources at different time intervals or subframes of each frame, and/or by reading out different rows and columns in successive frames.

Another aspect of the present disclosure relates to a system for reading a target to be electro-optically read by image capture. The system includes a housing, preferably a handheld housing having a handle, and a light-transmissive window. The above-described imaging module is mounted in the housing, and the above-described illumination light sources project the visible illumination lights through the window to illuminate the target, and the above-described imaging sensor captures the return light from the target through the window.

Still another aspect of the present disclosure relates to a method of reading a target to be electro-optically read by image capture. The method is performed by capturing return light from the target over successive frames; by energizing at least one light source and simultaneously deenergizing at least another light source during at least one of the frames to capture the return light from the illuminated target as at least a first image portion having a first target portion; by energizing the at least other light source and simultaneously deenergizing the at least one light source during at least another of the frames to capture the return light from the illuminated target as at least a second image portion having a second target portion; and by processing the first and second image portions together and alternately the first and second target portions together to read the target. The processing is performed by combining the first and second image portions together to form a composite image, and then processing the composite image to enable the target to be read. Alternately, the processing is performed by combining the first and second target portions together to form the target to be read. Advantageously, the method is further performed by subdividing each frame into a plurality of subframes; by energizing and deenergizing the at least one light source, and simultaneously deenergizing and energizing the at least other light source, during the subframes of the at least one frame to capture the return light from the illuminated target as a plurality of the first image portions having a plurality of the first target portions; and by energizing and deenergizing the at least other light source, and simultaneously deenergizing and energizing the at least one light source, during the subframes of the at least other frame to capture the return light from the illuminated target as a plurality of the second image portions having a plurality of the second target portions. Either the plurality of the image portions are combined to form a composite image to be processed and read, or the plurality of the target portions are combined to form the target to be processed and read.

Figure 1:
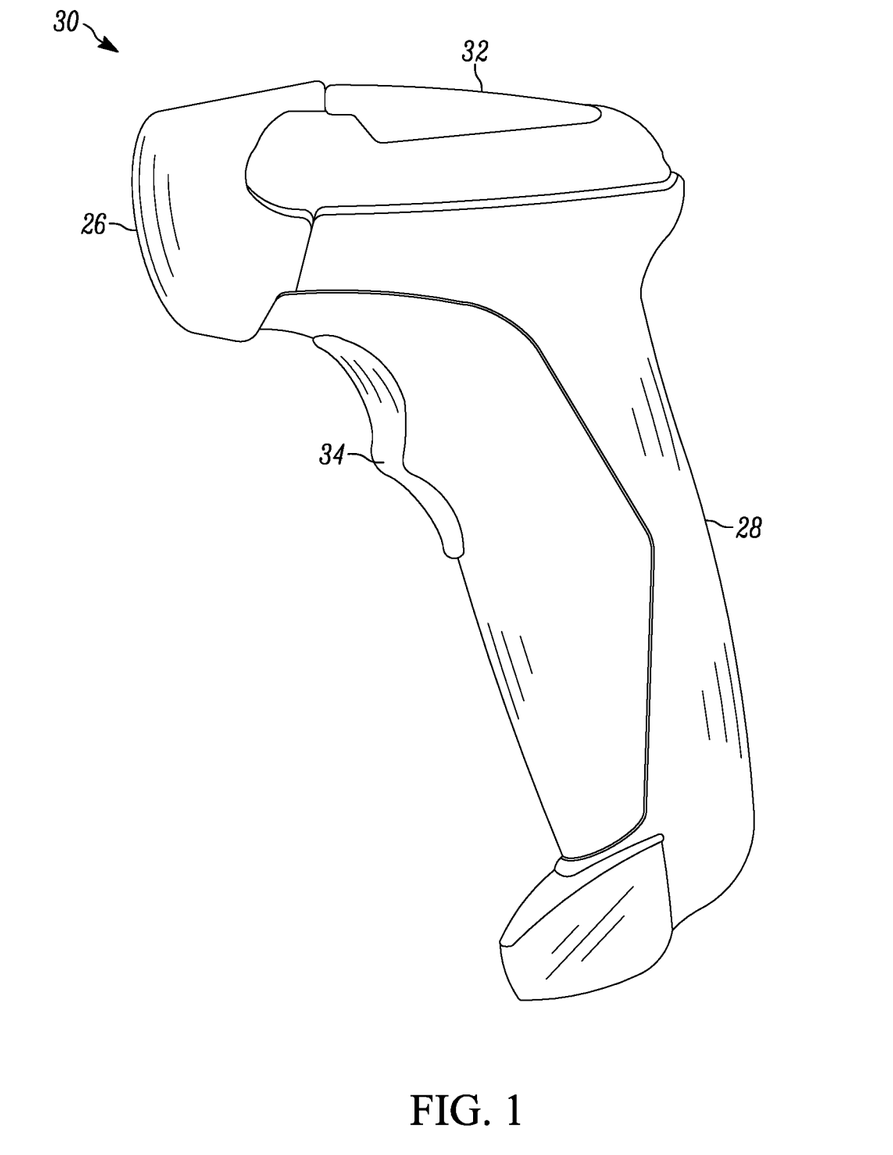
FIG. 1 is a side elevational view of a portable, handheld, imaging reader operative for electro-optically reading a target by image capture in accordance with this disclosure.

Reference numeral 30 in FIG. 1 generally identifies an ergonomic imaging reader configured as a gun-shaped housing having an upper barrel or body 32 and a lower handle 28 tilted rearwardly away from the body 32. A light-transmissive window 26 is located adjacent the front or nose of the body 32. The imaging reader 30 is held in an operator's hand and used in a handheld mode in which a trigger 34 is manually depressed to initiate imaging of targets, especially bar code symbols, to be read in a range of working distances relative to the window 26. Housings of other configurations, as well as readers operated in the hands-free mode, could also be employed. Thus, although FIG. 1 depicts a gun-shaped, handheld housing, this is merely exemplary, because it will be understood that many other reader configurations may be employed in the practice of this invention disclosed herein. For example, the reader may alternatively be configured as a vertical slot scanner having a generally upright window, or as a horizontal slot scanner or flat-bed scanner having a generally horizontal window, or as a bi-optical workstation having both a generally horizontal window and a generally upright window. The reader may be used in many diverse environments.

Figure 2:
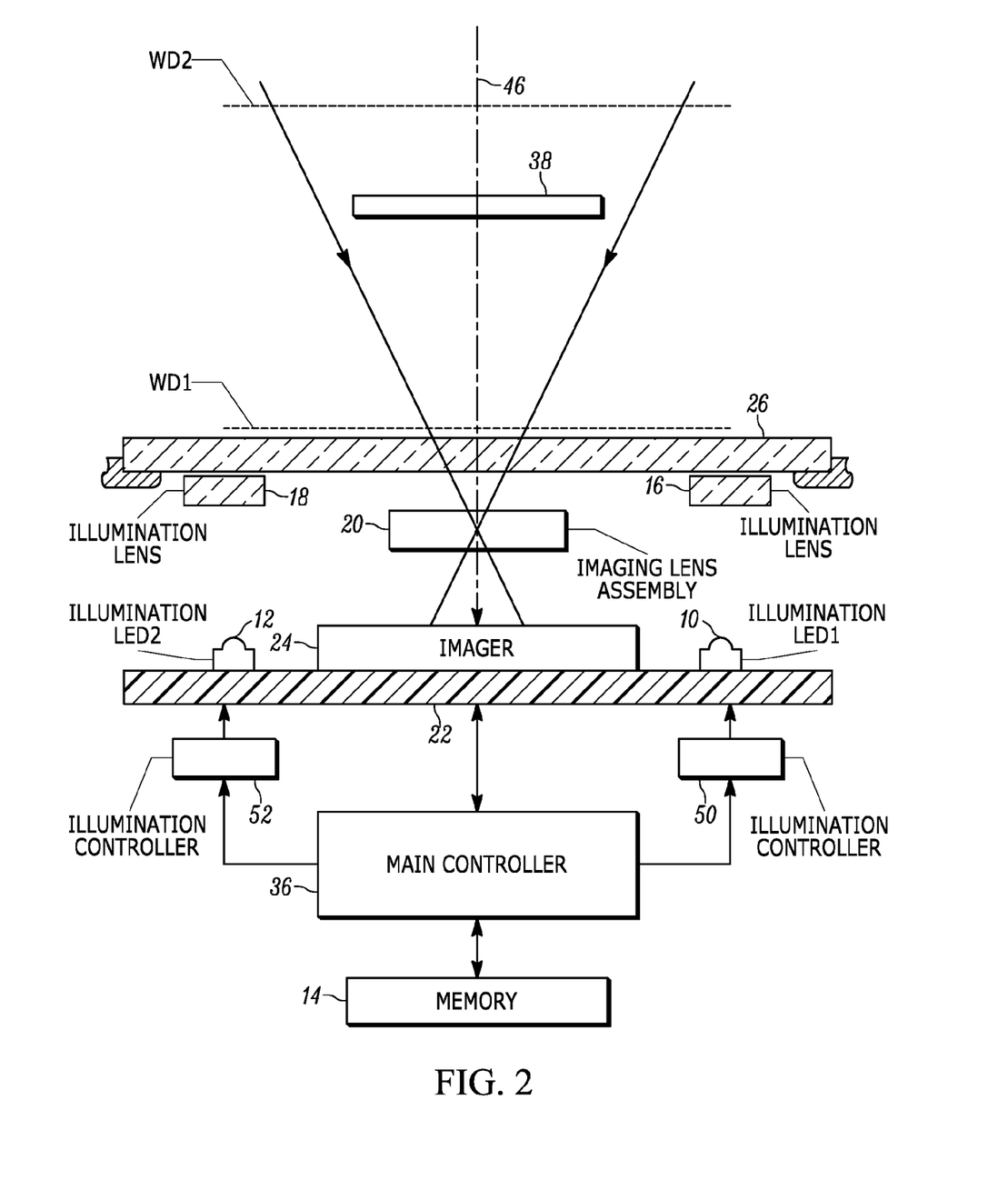
FIG. 2 is a schematic diagram of various components of an imaging module mounted in the reader of FIG. 1.

As schematically shown in FIG. 2, an imaging module includes an imaging sensor or imager 24 mounted on a printed circuit board (PCB) 22 in the reader 30. The imager 24 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, having a rolling or a global exposure shutter, and operative for detecting return light captured by an imaging lens assembly 20 along an imaging or optical axis 46 through the window 26 over an imaging field of view. The return light is scattered and/or reflected from a bar code symbol or target 38 over the imaging field of view. An exemplary symbol or target 38 has elements, e.g., bars and spaces, of different light reflectivity and spaced apart to define a machine-readable code that is indicative of an object that is attached to, or associated with, the symbol or target 38. The imaging lens assembly 20 is operative for focusing the return light onto the array of image sensors to enable the target 38 to be imaged and read. The target 38 may be located anywhere in a working range of distances between a close-in working distance (WD1) and a far-out working distance (WD2). In a preferred embodiment, WD1 is about one-half inch from the window 26, and WD2 is about thirty inches from the window 26.

An illuminating light assembly is also mounted on the module in the reader 30, and includes a plurality of illumination light sources 10, 12, e.g., at least a pair of light emitting diodes LED1 and LED2, mounted on the PCB 22, and a pair of illumination lenses 16, 18 for shaping the illumination light emitted by the illumination LED1 and LED2. At least part of the scattered and/or reflected return light is derived from the illumination light on and along the target 38. The illuminating light assembly is preferably located in a close confronting relationship with the window 26, for example, no more than a few millimeters away.

As also shown in FIG. 2, the imager 24 and the LED1, LED2 are operatively connected to a main controller or programmed microprocessor 36 operative for controlling the operation of these components. The main controller 36 is connected to the LED1 through an illumination controller 50, and is connected to the LED2 through an illumination controller 52. A memory 14 is connected and accessible to the main controller 36. Preferably, the main controller 36 is also used for processing the electrical signals from the imager 24 and for processing and decoding the captured target images. The main controller 36 and the memory 14 may advantageously be mounted on the PCB 22.

In operation, as more particularly described below, the main controller 36 sends command signals via the illumination controllers 50, 52 to energize and deenergize the light sources LED1 and LED2, and energizes and exposes the imager 24 to collect the return light, e.g., the illumination light and/or ambient light, from the target 38. A typical array needs about 18-33 milliseconds to acquire the entire target image and operates at a frame rate of about 30-60 Hz.

Figure 3:
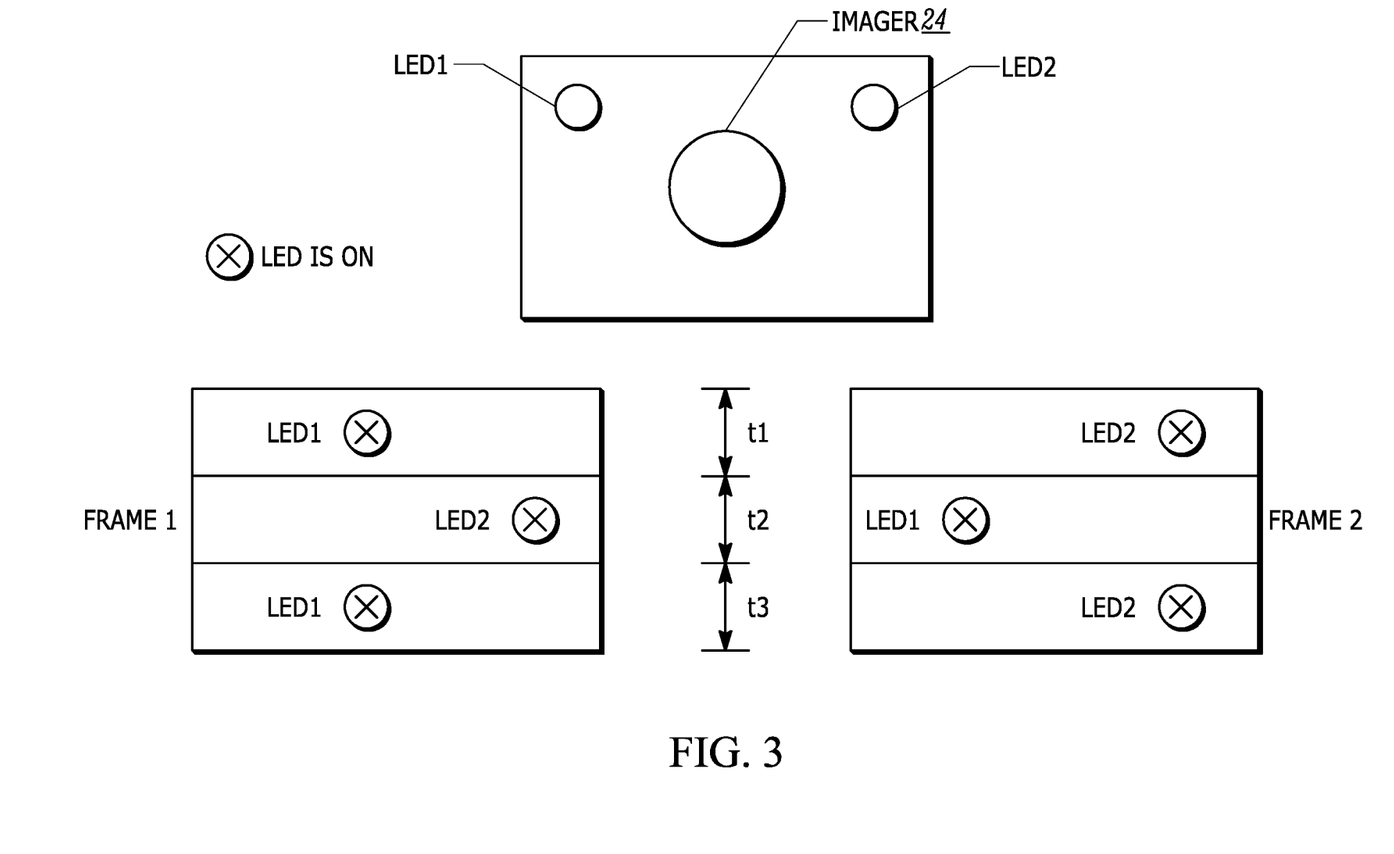
FIG. 3 is a schematic view depicting the alternate energization and deenergization of a pair of illumination LEDs mounted on the imaging module of FIG. 2 during successive frames of an imager having a rolling shutter, each frame being subdivided into three subframes or time intervals.

Turning now to FIG. 3, the imaging module is shown with LED1 and LED2 on opposite sides of the imager 24 having a rolling shutter, and two successive frames, Frame1 and Frame2, are also shown. In this embodiment, the main controller 36 subdivides each frame into a plurality of subframes, in this case, three subframes, each of time duration t1, t2, and t3. Although the subframes are illustrated as being of equal size and of equal time duration, the subframes may be of unequal size and of unequal time duration. In the first subframe t1 of Frame1, LED1 is energized, and LED2 is deenergized. In the second subframe t2 of Frame1, LED2 is energized, and LED1 is deenergized. In the third subframe t3 of Frame1, LED1 is again energized, and LED2 is again deenergized. In the first subframe t1 of Frame2, LED2 is energized, and LED1 is deenergized. In the second subframe t2 of Frame2, LED1 is energized, and LED2 is deenergized. In the third subframe t3 of Frame2, LED2 is again energized, and LED1 is again deenergized. Although the above description describes only one LED1 and only one LED2 as being energized and deenergized, it will be understood that more than one LED can be energized or deenergized in any one subframe.

During the successive subframes t1, t2, and t3 of the Frame1, the imager 24 captures the return light from the illuminated target as a plurality of first image portions having a plurality of first target portions. During the successive subframes t1, t2, and t3 of the Frame2, the imager 24 captures the return light from the illuminated target as a plurality of second image portions having a plurality of second target portions. In the case where the target is a symbol, each target portion includes a data pattern, e.g., at least part of the elements, i.e. bars and spaces, of the symbol. The main controller 36 combines and stitches areas of the pluralities of the first and second target portions from the first and second image portions that are substantially free of specular reflection to form the target 38 to be read. Alternately, the main controller 36 combines and stitches the first and second image portions that are substantially free of specular reflection to form a composite image, and then processes the composite image to read the target.

The main controller 36 energizes and deenergizes each LED1, LED2 at a pulse or blink rate that is at least equal to the frame rate, and, in the case of FIG. 3, the blink rate is 1.5 times the frame rate. Thus, if the frame rate is 30-60 Hz, then the blink rate is 45-90 Hz, which is typically sufficiently fast enough to avoid annoying an operator, or other persons in the vicinity.

Figure 4:
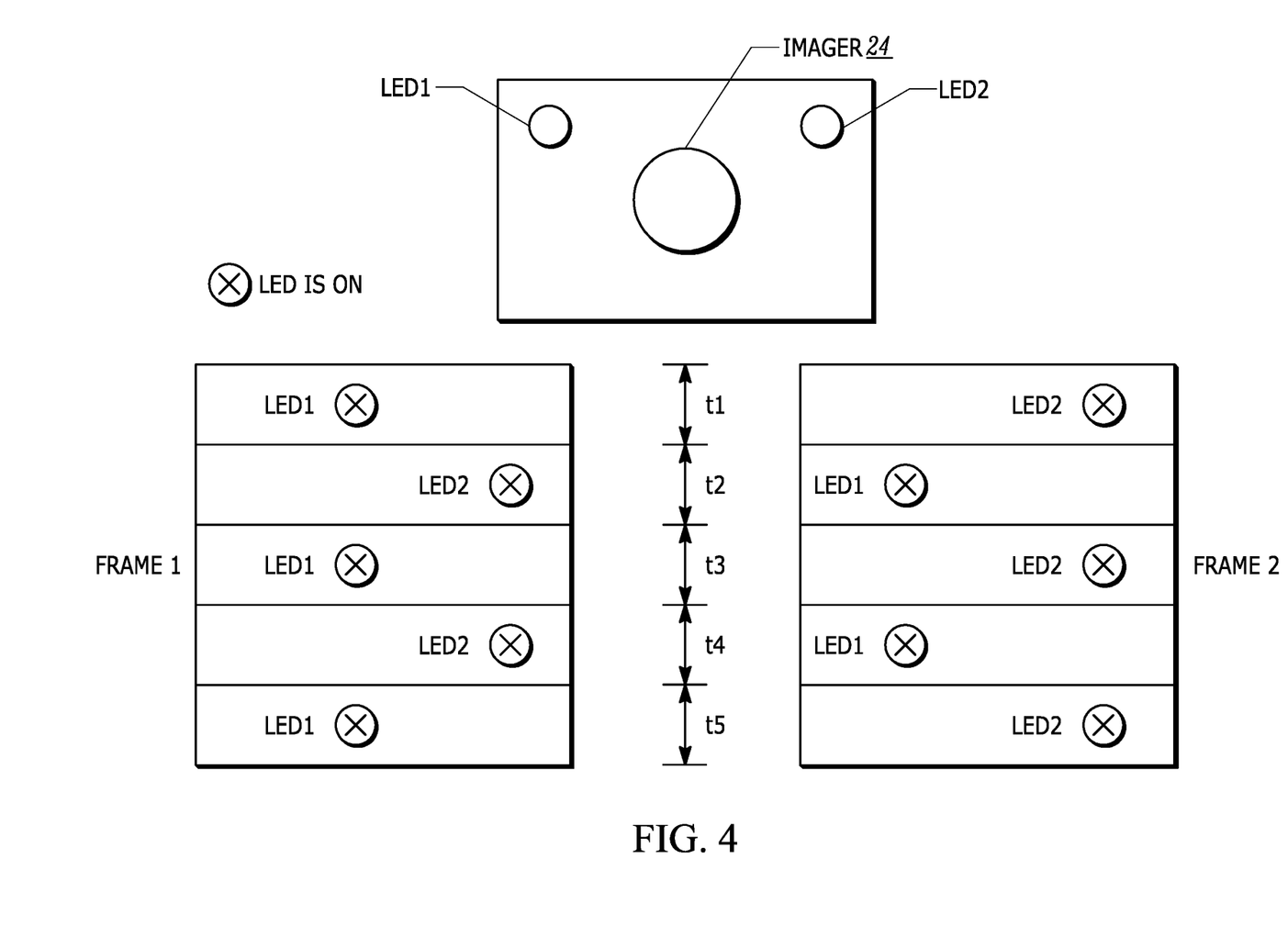
FIG. 4 is a schematic view depicting the alternate energization and deenergization of a pair of illumination LEDs mounted on the imaging module of FIG. 2 during successive frames of an imager having a rolling shutter, each frame being subdivided into five subframes or time intervals.

FIG. 4 is analogous to FIG. 3, except that the main controller 36 has subdivided each of Frame1 and Frame2 into five subframes, each of time duration t1, t2, t3, t4 and t5. The energization and deenergization of LED1 and LED2 is as before. In this embodiment, the blink rate is 2.5 times the frame rate. Thus, if the frame rate is 30-60 Hz, then the blink rate is 75-150 Hz, which is rapid enough to avoid annoying the operator, or other persons in the vicinity.

Figure 5:
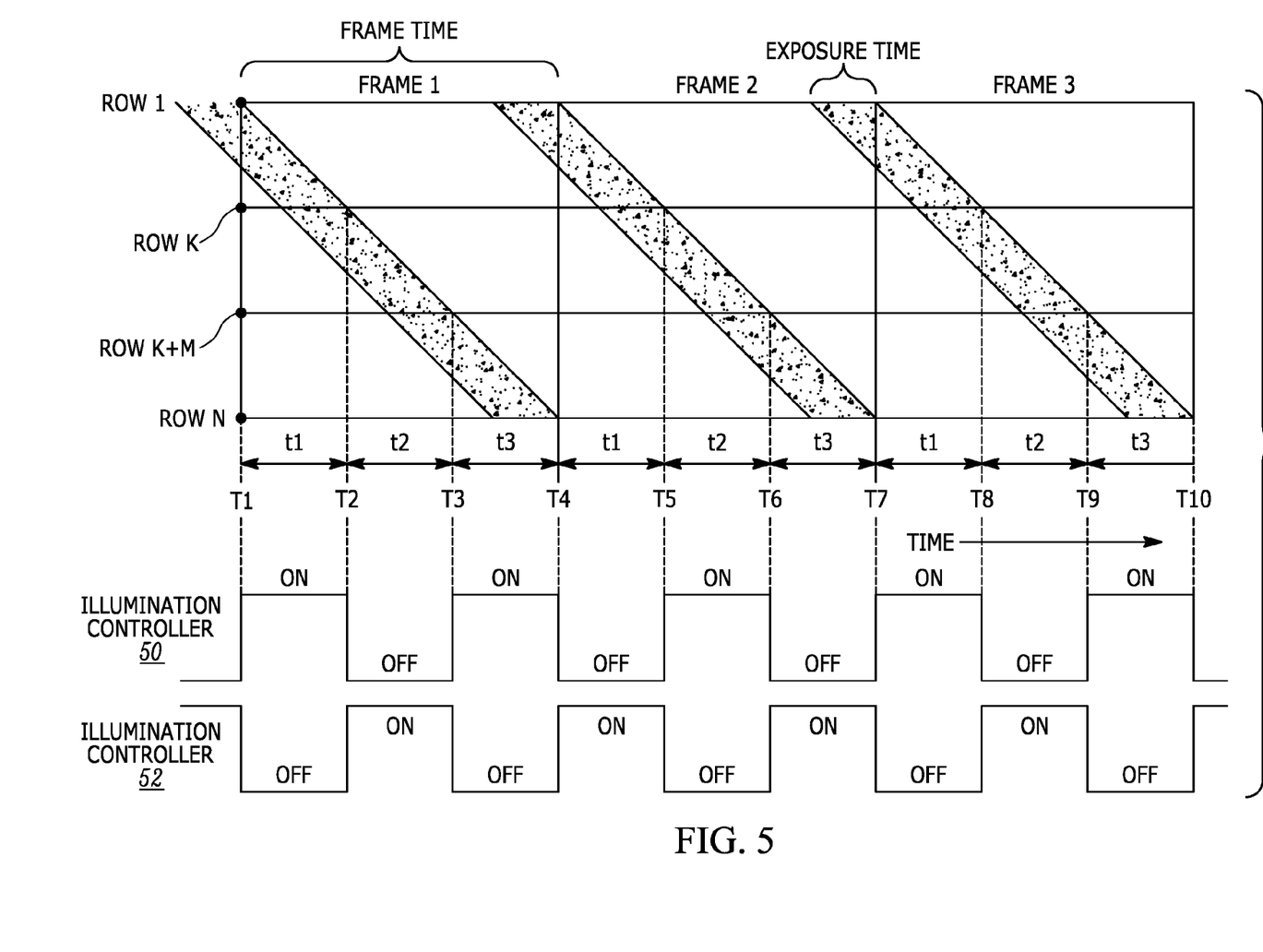
FIG. 5 is a set of timing graphs depicting when the pair of illumination LEDs of FIG. 3 are energized and deenergized during successive frames of an imager having a rolling shutter.

FIG. 5 depicts the operation of the system of this disclosure, in the case of the embodiment of FIG. 3. Three successive frames, Frame1, Frame2, and Frame3, and their exposure times (shown by speckled areas) are illustrated. The first, second, and third frames start at times T1, T4, and 17, respectively; and end at times T4, 17, and T10, respectively. For a rolling shutter, each exposure time starts slightly before its respective frame time. The pixels of the array of the imager 24 having a rolling shutter are arranged in mutually orthogonal rows and columns; and the first row 1 is shown at the top, while the last row N is shown at the bottom, of FIG. 5. In a central portion of the array, a plurality or single group or middle band of the rows, which constitute a fraction of all the rows of the array, i.e., a sub-array, extends row-wise horizontally across the array, and starts from a higher middle row K and ends at a lower middle row K+M, where M is one or more. Exposure and read-out of the pixels begins at row 1, and continues along the illustrated downwards slope from left to right, over increasing time, across the middle rows K and K+M, and ends at row N.

As also shown in FIG. 5, the illumination controller 50 and LED1 are turned ON, and simultaneously, the illumination controller 52 and LED2 are turned OFF, by the main controller 50, during the first subframe of time duration t1 between times T1 and T2 of Frame1. During the second subframe of time duration t2 between times T2 and T3 of Frame1, the illumination controller 50 and LED1 are turned OFF, and simultaneously, the illumination controller 52 and LED2 are turned ON. During the third subframe of time duration t3 between times T3 and T4 of Frame1, the illumination controller 50 and LED1 are again turned ON, and simultaneously, the illumination controller 52 and LED2 are again turned OFF. Thus, Frame 1 has been subdivided into thirds, and only one of the LEDs is energized in each third to illuminate the target for capture by a sub-array or minor fraction of the total number of the rows and columns. At least one of the LEDs has been pulsed a plurality of times during each frame. The subframes of Frame1 of FIG. 5 need not be of equal size or of equal time duration.

As further shown in FIG. 5, the illumination controller 50 and LED1 are turned OFF, and simultaneously, the illumination controller 52 and LED2 are turned ON, by the main controller 50, during the first subframe of time duration t1 between times T4 and T5 of Frame2. During the second subframe of time duration t2 between times T5 and T6 of Frame2, the illumination controller 50 and LED1 are turned ON, and simultaneously, the illumination controller 52 and LED2 are turned OFF. During the third subframe of time duration t3 between times T6 and T7 of Frame2, the illumination controller 50 and LED1 are again turned OFF, and simultaneously, the illumination controller 52 and LED2 are again turned ON. Thus, Frame 2 has also been subdivided into thirds, and only one of the LEDs is energized in each third to illuminate the target for capture by a sub-array or minor fraction of the total number of the rows and columns. At least one of the LEDs has been pulsed a plurality of times during each frame. The subframes of Frame2 of FIG. 5 need not be of equal size or of equal time duration. The above-described cycle repeats for Frame3 and for successive frames.

Figure 6:
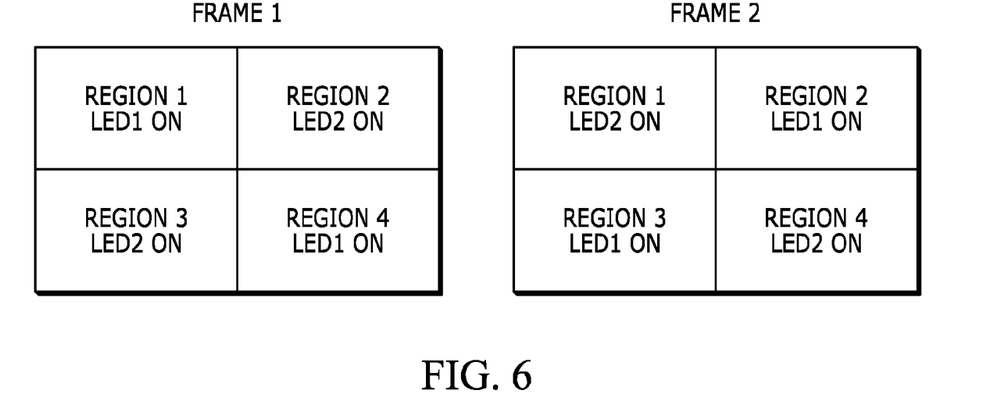
FIG. 6 is a schematic view depicting the alternate energization and deenergization of a pair of illumination LEDs mounted on the imaging module of FIG. 2 during successive frames of an imager having a global shutter, each frame being subdivided into four subframes or time intervals.

Rather than a rolling shutter, the imaging sensor may have a global shutter for simultaneously exposing all the rows of photosensors of the array, in which case, a slit readout is used for sequentially reading out a minor fraction of a total number of the rows and columns during each subframe, thereby defining a sub-array or region that has an aspect ratio. As shown in FIG. 6, each of Frame1 and Frame2 is subdivided into four subframes or quadrants of the array, thereby defining four sub-arrays or Region1, Region2, Region3, and Region4. In Frame1, only LED1 is energized for a time duration in Region1; only LED2 is energized for a time duration in Region2; only LED2 is energized for a time duration in Region3; and only LED1 is energized for a time duration in Region4. In Frame2, only LED2 is energized for a time duration in Region1; only LED1 is energized for a time duration in Region2; only LED1 is energized for a time duration in Region3; and only LED2 is energized for a time duration in Region4. The Regions1-4 need not be of equal size or of equal time duration. Also each sub-array or each of Regions1-4 may have any desired aspect ratio. The rows and/or columns in each sub-array or each of Regions1-4 need not be consecutive; for example, one sub-array or region may comprise some or all of the even rows and/or columns, and another sub-array or region may comprise some or all of the odd rows and/or columns. In this embodiment, the blink rate is 2 times the frame rate.

Figure 7:
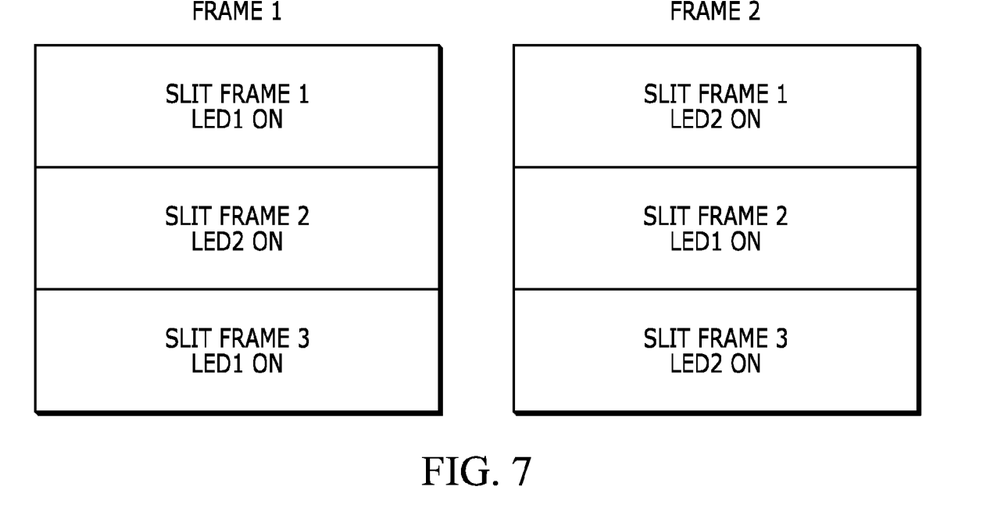
FIG. 7 is a schematic view depicting the alternate energization and deenergization of a pair of illumination LEDs mounted on the imaging module of FIG. 2 during successive frames of an imager having a global shutter, each frame being subdivided into three subframes or time intervals.

As shown in FIG. 7, each of Frame1 and Frame2 is subdivided into three subframes or Slit Frame1, Slit Frame2, and Slit Frame3, of an array of an imaging sensor having a global shutter. In Frame1, only LED1 is energized for a time duration in Slit Frame1; only LED2 is energized for a time duration in Slit Frame2; and only LED1 is energized for a time duration in Slit Frame3. In Frame2, only LED2 is energized for a time duration in Slit Frame1; only LED1 is energized for a time duration in Slit Frame2; and only LED2 is energized for a time duration in Slit Frame3. The Slit Frames need not be of equal size or of equal time duration. The rows and/or columns in each sub-array or each Slit Frame need not be consecutive; for example, one sub-array or Slit Frame may comprise some or all of the even rows and/or columns, and another sub-array or Slit Frame may comprise some or all of the odd rows and/or columns. In this embodiment, the blink rate is 1.5 times the frame rate.

Figure 8:
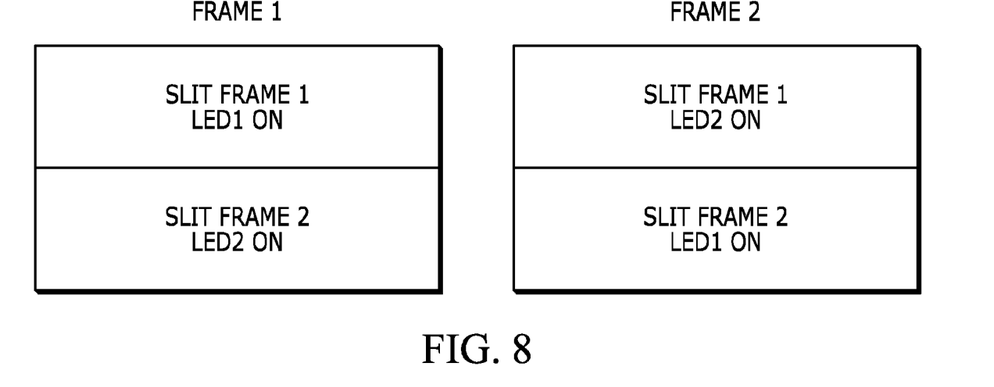
FIG. 8 is a schematic view depicting the alternate energization and deenergization of a pair of illumination LEDs mounted on the imaging module of FIG. 2 during successive frames of an imager having a global shutter, each frame being subdivided into two subframes or time intervals.

As shown in FIG. 8, each of Frame1 and Frame2 is subdivided into two subframes or Slit Frame1 and Slit Frame2, of an array of an imaging sensor having a global shutter. In Frame1, only LED1 is energized for a time duration in Slit Frame1; and only LED2 is energized for a time duration in Slit Frame2. In Frame2, only LED2 is energized for a time duration in Slit Frame1; and only LED1 is energized for a time duration in Slit Frame2. The Slit Frames need not be of equal size or of equal time duration. The rows and/or columns in each sub-array or each Slit Frame need not be consecutive; for example, one sub-array or Slit Frame may comprise some or all of the even rows and/or columns, and another sub-array or Slit Frame may comprise some or all of the odd rows and/or columns. In this embodiment, the blink rate is equal to the frame rate.

Figure 9:
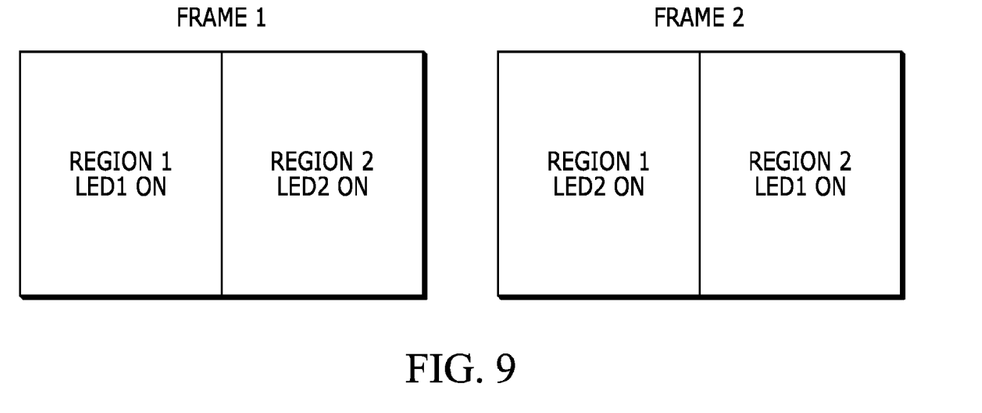
FIG. 9 is a schematic view depicting the alternate energization and deenergization of a pair of illumination LEDs mounted on the imaging module of FIG. 2 during successive frames of an imager having a global shutter, each frame being subdivided into two subframes or time intervals having a different aspect ratio than that of FIG. 8.

As shown in FIG. 9, each of Frame1 and Frame2 is subdivided into two subframes or halves of the array, thereby defining two sub-arrays or Region1 and Region2. In Frame1, only LED1 is energized for a time duration in Region1; and only LED2 is energized for a time duration in Region2. In Frame2, only LED2 is energized for a time duration in Region1; and only LED1 is energized for a time duration in Region2. The Regions1-2 need not be of equal size or of equal time duration. Also each sub-array or each of Regions1-2 may have any desired aspect ratio. Thus, each sub-array of FIG. 9 has half rows and full columns, whereas each sub-array of FIG. 8 has half columns and full rows. The rows and/or columns in each sub-array or each of Regions1-2 need not be consecutive; for example, one sub-array or region may comprise some or all of the even rows and/or columns, and another sub-array or region may comprise some or all of the odd rows and/or columns. In this embodiment, the blink rate is equal to the frame rate.

In all of the embodiments described above, each subframe can come from any portion of the array of the imager. A subframe can be a diverse collection of rows, or columns, or regions, or slit frames, and the rows or columns need not be consecutive. The illumination light sources are independently controlled to produce a plurality of image portions each having target portions or areas substantially free of specular reflection. When the target is a symbol, these target portions include the aforementioned data patterns, which are then combined and stitched together to form the target 38, which can then be processed and read without interference from specular reflection. Alternately, the image portions are combined and stitched together to form a composite image, which can then be processed and read without interference from specular reflection.

Figure 10:
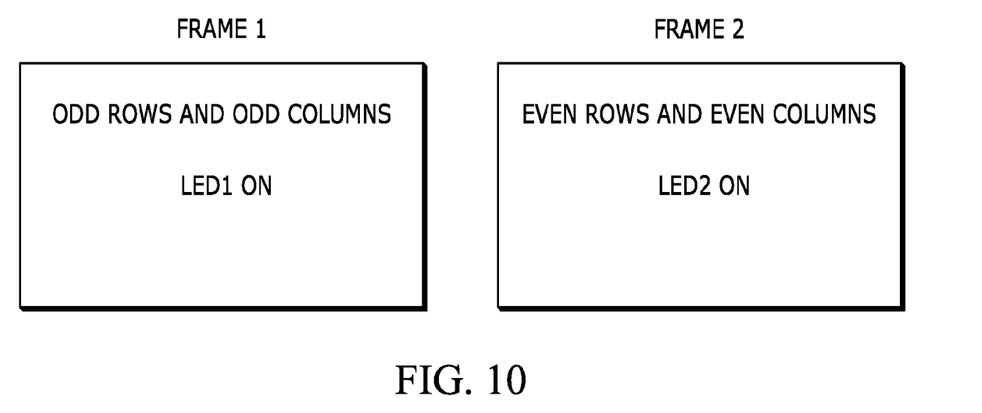
FIG. 10 is a schematic view depicting the alternate energization and deenergization of a pair of illumination LEDs mounted on the imaging module of FIG. 2 during successive frames of an imager having a global shutter, the odd-numbered rows and columns of the imager being read out in a first frame, and the even-numbered rows and columns being read out in a second frame.

As shown in FIG. 10, the frames need not be subdivided into subframes. Thus, only some of the rows and columns, e.g., the odd-numbered rows and odd-numbered columns, are read out while only LED1 is energized during Frame1, and only others of the rows and columns, e.g., the even-numbered rows and even-numbered columns, are read out while only LED2 is energized during Frame2.

In the foregoing specification, specific embodiments have been described. However, one of ordinary skill in the art appreciates that various modifications and changes can be made without departing from the scope of the invention as set forth in the claims below. For example, as used herein, the term "deenergize" and its derivatives do not necessarily mean that a particular light source is completely turned off, but is also intended to signify that the light source may be dimmed, i.e., partially turned off. In addition, the Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for electro-optically reading a target by image capture, the module comprising:
   a plurality of illumination light sources;
   an imaging sensor for capturing return light from the target over successive frames; and
   a main controller operatively connected to the light sources and the imaging sensor, and operative for
      energizing at least one of the light sources and simultaneously deenergizing at least another of the light sources during at least one of the frames to capture the return light from the illuminated target as at least a first image portion having a first target portion,
      energizing the at least another of the light sources and simultaneously deenergizing the at least one of the light sources during at least another of the frames to capture the return light from the illuminated target as at least a second image portion having a second target portion, and
      processing the first and second image portions together and alternately the first and second target portions together to read the target,
   wherein the main controller processes the first and second target portions by combining the first and second target portions to form the target to be read.

2. The module of claim 1, wherein the imaging sensor is operative for capturing return light from the target over successive frames at a frame rate, and wherein the main controller energizes and deenergizes each light source at a blink rate that is at least equal to the frame rate.

3. The module of claim 1, wherein the main controller is further operative for subdividing each frame into a plurality of subframes;
   energizing and deenergizing the at least one light source, and simultaneously deenergizing and energizing the at least other light source, during the subframes of the at least one frame to capture the return light from the illuminated target as a plurality of the first image portions having a plurality of the first target portions;
   energizing and deenergizing the at least other light source, and simultaneously deenergizing and energizing the at least one light source, during the subframes of the at least other frame to capture the return light from the illuminated target as a plurality of the second image portions having a plurality of the second target portions; and
   processing the plurality of the first and second image portions together and alternately the plurality of the first and second target portions together to read the target.

4. The module of claim 3, wherein the imaging sensor is a solid-state device having an array of photosensors arranged along mutually orthogonal rows and columns, and has a rolling shutter for sequentially exposing the rows and columns of photosensors of the array, and wherein each subframe includes a minor fraction of a total number of the rows and columns.

5. The module of claim 3, wherein the imaging sensor is a solid-state device having an array of photosensors arranged along mutually orthogonal rows and columns, and has a global shutter for simultaneously exposing all the rows of photosensors of the array, and a slit readout for sequentially reading out a minor fraction of a total number of the rows and columns during each subframe.

6. The module of claim 1, wherein the imaging sensor is a solid-state device having an array of photosensors arranged along mutually orthogonal rows and columns, and has a global shutter for simultaneously exposing all the rows of photosensors of the array, and a readout for reading out odd-numbered rows and odd-numbered columns during the at least one frame, and for reading out even-numbered rows and even-numbered columns during the at least other frame.

7. The module of claim 1, wherein the main controller processes the first and second images by combining the first and second images to form a composite image, and by processing the composite image to enable the target to be read.

8. A system for electro-optically reading a target by image capture, the system comprising:
   a housing having a light-transmissive window; and
   an imaging module mounted in the housing, the module including a plurality of illumination light sources, an imaging sensor for capturing return light from the target through the window over successive frames, and a main controller operatively connected to the light sources and the imaging sensor, the main controller being operative for
      energizing at least one of the light sources and simultaneously deenergizing at least another of the light sources during at least one of the frames to capture the return light from the illuminated target through the window as at least a first image portion having a first target portion,
      energizing the at least another of the light sources and simultaneously deenergizing the at least one of the light sources during at least another of the frames to capture the return light from the illuminated target through the window as at least a second image portion having a second target portion, and
      processing the first and second image portions together and alternately the first and second target portions together to read the target,
   wherein the imaging sensor is operative for capturing return light from the target over successive frames at a frame rate, and wherein the main controller energizes and deenergizes each light source at a blink rate that is at least equal to the frame rate.

9. The system of claim 8, wherein the main controller is further operative for subdividing each frame into a plurality of subframes;

energizing and deenergizing the at least one light source, and simultaneously deenergizing and energizing the at least other light source, during the subframes of the at least one frame to capture the return light from the illuminated target as a plurality of the first image portions having a plurality of the first target portions;

energizing and deenergizing the at least other light source, and simultaneously deenergizing and energizing the at least one light source, during the subframes of the at least other frame to capture the return light from the illuminated target as a plurality of the second image portions having a plurality of the second target portions; and processing the plurality of the first and second image portions together and alternately the plurality of the first and second target portions together to read the target.

10. The system of claim 9, wherein the imaging sensor is a solid-state device having an array of photosensors arranged along mutually orthogonal rows and columns, and has a rolling shutter for sequentially exposing the rows and columns of photosensors of the array, and wherein each subframe includes a minor fraction of a total number of the rows and columns.

11. The system of claim 9, wherein the imaging sensor is a solid-state device having an array of photosensors arranged along mutually orthogonal rows and columns, and has a global shutter for simultaneously exposing all the rows of photosensors of the array, and a slit readout for sequentially reading out a minor fraction of a total number of the rows and columns during each subframe.

12. The system of claim 8, wherein the imaging sensor is a solid-state device having an array of photosensors arranged along mutually orthogonal rows and columns, and has a global shutter for simultaneously exposing all the rows of photosensors of the array, and a readout for reading out odd-numbered rows and odd-numbered columns during the at least one frame, and for reading out even-numbered rows and even-numbered columns during the at least other frame.

13. A method of electro-optically reading a target by image capture, the method comprising:

capturing return light from the target over successive frames;

a main controller operatively connected to the light sources and the imaging sensor, and operative for energizing at least one light source and simultaneously deenergizing at least another light source during at least one of the frames to capture the return light from the illuminated target as at least a first image portion having a first target portion;

energizing the at least another of the light sources and simultaneously deenergizing the at least one of the light sources during at least another of the frames to capture the return light from the illuminated target as at least a second image portion having a second target portion; and processing the first and second image portions together and alternately the first and second target portions together to read the target, wherein the capturing of the return light from the target over successive frames is performed at a frame rate, and wherein the energizing and deenergizing of each light source is performed at a blink rate that is at least equal to the frame rate.

14. The method of claim 13, and further comprising subdividing each frame into a plurality of subframes;

energizing and deenergizing the at least one light source, and simultaneously deenergizing and energizing the at least other light source, during the subframes of the at least one frame to capture the return light from the illuminated target as a plurality of the first image portions having a plurality of the first target portions;

energizing and deenergizing the at least other light source, and simultaneously deenergizing and energizing the at least one light source, during the subframes of the at least other frame to capture the return light from the illuminated target as a plurality of the second image portions having a plurality of the second target portions; and processing the plurality of the first and second image portions together and alternately the plurality of the first and second target portions together to read the target.

15. The method of claim 14, wherein the capturing is performed with an array of photosensors arranged along mutually orthogonal rows and columns, by sequentially exposing the rows and columns of photosensors of the array, and configuring each subframe to include a minor fraction of a total number of the rows and columns.

16. The method of claim 14, wherein the capturing is performed with an array of photosensors arranged along mutually orthogonal rows and columns, by simultaneously exposing all the rows of photosensors of the array, and by sequentially reading out a minor fraction of a total number of the rows and columns during each subframe.

17. The method of claim 13, wherein the capturing is performed with an array of photosensors arranged along mutually orthogonal rows and columns, by simultaneously exposing all the rows of photosensors of the array, by reading out odd-numbered rows and odd-numbered columns during the at least one frame, and by reading out even-numbered rows and even-numbered columns during the at least other frame.

18. An imaging module for electro-optically reading a target by image capture, the module comprising:

a plurality of illumination light sources;

an imaging sensor for capturing return light from the target over successive frames; and a main controller operatively connected to the light sources and the imaging sensor, and operative for energizing at least one of the light sources and simultaneously deenergizing at least another of the light sources during at least one of the frames to capture the return light from the illuminated target as at least a first image portion having a first target portion, energizing the at least another of the light sources and simultaneously deenergizing the at least one of the light sources during at least another of the frames to capture the return light from the illuminated target as at least a second image portion having a second target portion, and processing the first and second image portions together and alternately the first and second target portions together to read the target, wherein the main controller processes the first and second images by combining the first and second images to form a composite image, and by processing the composite image to enable the target to be read.

19. A system for electro-optically reading a target by image capture, the system comprising:

a housing having a light-transmissive window; and an imaging module mounted in the housing, the module including a plurality of illumination light sources, an imaging sensor for capturing return light from the target through the window over successive frames, and a main controller operatively connected to the light sources and the imaging sensor, the main controller being operative for energizing at least one of the light sources and simultaneously deenergizing at least another of the light sources during at least one of the frames to capture the return light from the illuminated target through the window as at least a first image portion having a first target portion, energizing the at least another of the light sources and simultaneously deenergizing the at least one of the light sources during at least another of the frames to capture the return light from the illuminated target through the window as at least a second image portion having a second target portion, and processing the first and second image portions together and alternately the first and second target portions together to read the target, wherein the imaging sensor is a solid-state device having an array of photosensors arranged along mutually orthogonal rows and columns, and has a global shutter for simultaneously exposing all the rows of photosensors of the array, and a readout for reading out odd-numbered rows and odd-numbered columns during the at least one frame, and for reading out even-numbered rows and even-numbered columns during the at least other frame.

* * * * *